(12) United States Patent
Bast et al.

(10) Patent No.: US 8,005,610 B2
(45) Date of Patent: Aug. 23, 2011

(54) METHOD AND DEVICE FOR DETERMINING THE LENGTH OF A SHORTEST PATH IN A NETWORK

(75) Inventors: Holger Bast, Saarbrücken (DE); Stefan Funke, Saarbrücken (DE); Domagoj Matijevic, Osijek (HR)

(73) Assignee: Max-Planck-Gesellschaft zur Förderung der Wissenschaften e.V, Munich (DE)

( * ) Notice: Subject to any disclaimer, the term of this patent is extended or adjusted under 35 U.S.C. 154(b) by 958 days.

(21) Appl. No.: 11/889,336

(22) Filed: Aug. 10, 2007

(65) Prior Publication Data

US 2009/0040931 A1    Feb. 12, 2009

(51) Int. Cl.
*G01C 21/00*    (2006.01)
(52) U.S. Cl. .................. 701/200; 701/201; 701/202
(58) Field of Classification Search .......... 701/200–203, 701/206–215; 340/988, 990.1, 995.19
See application file for complete search history.

(56) References Cited

U.S. PATENT DOCUMENTS

| | | | | |
|---|---|---|---|---|
| 5,638,280 | A  * | 6/1997 | Nishimura et al. | 701/209 |
| 6,263,277 | B1 * | 7/2001 | Tanimoto et al. | 701/209 |
| 6,266,613 | B1 * | 7/2001 | Nimura et al. | 701/210 |
| 7,739,029 | B2 * | 6/2010 | Ishikawa et al. | 701/117 |

* cited by examiner

*Primary Examiner* — Yonel Beaulieu
(74) *Attorney, Agent, or Firm* — Davidson Berquist Jackson & Gowdey, LLP; Brian Siritzky

(57) ABSTRACT

A computer-implemented method for pre-processing a network, wherein the network comprises nodes and edges, each edge having a length measured according to a given metric, comprises the steps of selecting a source and a target node; determining a transit node for the selection; determining a length of a shortest path between the source node and the transit node; and storing it. A method for determining the length of a shortest path in the network may use the pre-processed network to answer the shortest path query in constant time.

16 Claims, 7 Drawing Sheets

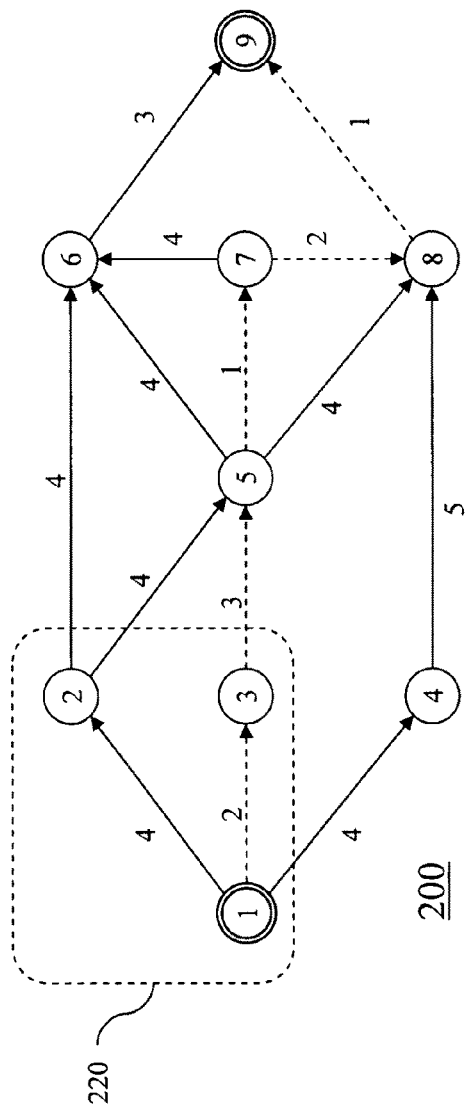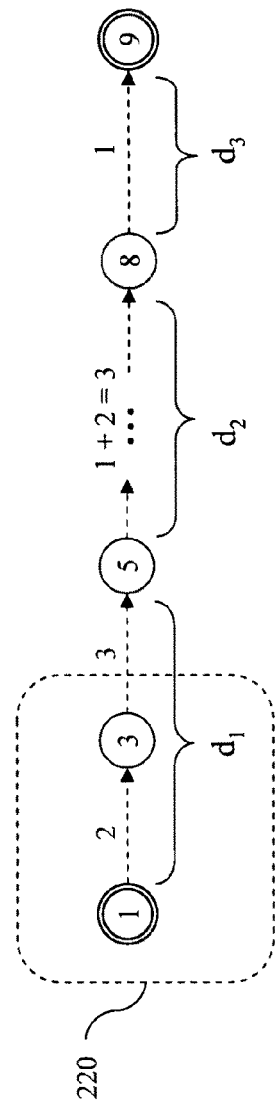
Fig. 2(a)
Fig. 2(b)

METHOD AND DEVICE FOR DETERMINING THE LENGTH OF A SHORTEST PATH IN A NETWORK

BACKGROUND OF THE INVENTION

The present invention relates to a method and a device for determining the length of a shortest path in a network. In particular, the present invention relates to the application of such a method and a device to road networks, for example in a road navigation device.

In general, the shortest path problem is the problem of finding a path between two nodes of a network such that the sum of the weights of its constituent edges is minimized. A practical example is finding the quickest way to get from one location to another on a road map; in this case, the vertices represent locations and the edges represent segments of road and are weighted by the time needed to travel that segment.

Formally, given a weighted graph (that is, a set V of vertices, a set E of edges, and a (real-valued) weight function f: E→R), and one element v of V, find a path P from v to each v' of V so that $$\sum_{p \in P} f(p)$$

is minimal among all paths connecting v to v'.

The classical way to compute the shortest path between two given nodes in a graph with given edge lengths is Dijkstra's algorithm. The asymptotic running time of Dijkstra's algorithm is O(m+n log m), where n is the number of nodes, and m is the number of edges. For graphs with constant degree, like for example road networks, this is O(n log n). Up to now, no better algorithm is known for computing the shortest path between two given nodes in a graph if no pre-processing is allowed and no assumptions on the graph, except for non-negative edge lengths, are made.

On the US road network, a good implementation of Dijkstra's algorithm on a single state-of-the-art PC takes a few seconds, on average, for a random query. For a random query, source and target are likely to be far away from each other, in which case Dijkstra's algorithm will settle a large portion of all nodes in the network before eventually reaching the target.

If, however, the topology of the graph or the network does not change (significantly) between queries, the above restrictions may be given up. Hence, the problem of determining the length of a shortest path in the network may be divided into the problem of pre-processing the network or creating a data structure from the network such that efficient queries become possible and the problem of efficiently querying that data structure. In other words, the network may be pre-processed in order to speed up the queries. Actual search in the network may then be carried out beforehand, thereby reducing computations to a simple lookup at query time.

However, a naïve approach would involve creating a lookup table for all possible queries concerning a given network. In order to store these distances, quadratic space would be needed. This would be prohibitive for e.g. the US road network, which has about 24 million nodes and 58 million edges.

An article by Gutman ("Reach-Based Routing: a new approach to shortest path algorithms optimized for road networks. Proceedings of the 6th Workshop on Algorithm Engineering and Experiments, 2004) proposes a general concept of edge levels for improving upon the naïve approach. Given an edge e that appears "in the middle" of a shortest paths, shortest with respect to travel time, between two nodes that are a certain distance d apart, distance with respect to some arbitrary other metric, e.g. Euclidean distance, the level of e is the higher, the larger d is. The article defines levels with respect to Euclidean distance, but notes that any metric can be used for the discrimination of the "in the middle" property. Simple algorithms are presented which compute upper bounds for the edge levels and instruments those to obtain more efficient exact shortest path queries on moderate-size road networks. Due to the use of the Euclidean metric as classifying metric, the approach allows for several variants of Dijkstra, in particular a natural goal-directed (unidirectional) version as well as efficient one-to-many shortest path queries. The (compared to later work) less competitive running times, both for the pre-processing phase as well as the queries are mostly due to the lack of an efficient compression scheme, which (in particular for the networks induced by higher level edges) improves the processing time considerably.

An article by Sanders and Schultes ("Engineering highway hierarchies". In: Proceedings of the 14th European Symposium on Algorithms ESA '06, pages 804-816, 2006) adopts a different classifying metric. In an ordinary Dijkstra computation from a source, the r-th node settled may be said to have Dijkstra rank r with respect to the source. The article defines the level of an edge as being high if it is on a shortest path between some source and target such that one node of the edge has high Dijkstra rank with respect to the source and the other node of the edge has high Dijkstra rank with respect to the target. The article achieves an improvement of an order of magnitude both in pre-processing time as well as query times, mainly because of a highly efficient compression and pruning scheme in the higher levels of the network. The output of the algorithm is a path containing compressed edges. However, it is not clear how much effort in both time and space is necessary to uncompress those edges. The presented variant is also inherently bidirectional, so both goal-direction as well as one-to-many queries are not easily added.

In an article by Goldberg et al. ("Reach for A*: Efficient point-to-point shortest path algorithms". In: Proceedings of the 8th Workshop on Algorithm Engineering and Experiments ALENEX '06, 2006) edge levels are combined with a compression scheme and lower bounds are used, based on pre-computed distances to a few landmarks, to allow for a more goal-directed search. Running times are reported that are comparable to those presented in the above-cited article by Sanders et al. However, the space consumption is higher, because every node in the network has to store distances to all landmarks.

Articles by Möhring et al. ("Acceleration of shortest path and constrained shortest path computation". In: Proceedings of the 4th Workshop on Experimental and Efficient Algorithms, WEA '05, pages 126-138, 2005 and "Partitioning graphs to speed up Dijkstra's algorithm". In: Proceedings of the 4th Workshop on Experimental and Efficient Algorithms WEA '05, pages 189-202, 2005) and, in independent work, Lauther ("An extremely fast, exact algorithm for finding shortest paths in static networks with geographical background". In: Münster GI-Tage, 2004) explored edge signs as a means to achieve very fast query times. Intuitively, an edge sign says whether that edge is on a shortest path to a particular region of the graph. In an extreme case, an edge could have a sign to every node on the shortest path to which it lies. A shortest path query could then be answered by simply following the signs to the target without any detour.

However, to pre-compute these perfect signs requires an all-pairs shortest-path computation, which takes quadratic time and would be infeasible already for a small portion of the whole road network, e.g. the road network of California. In the cited articles, it is shown how to cut down on this pre-processing, by putting up signs to sufficiently large regions of the graph, but pre-computation of those signs is still prohibitive for large networks.

It is therefore an object of the present invention to provide an improved method and device for determining the length of a shortest path in a network.

BRIEF SUMMARY OF THE INVENTION

This object is achieved by the method and device according to the annexed claims.

According to a first embodiment, a computer-implemented method for pre-processing a network, wherein the network comprises nodes and edges, each edge having a length measured according to a given metric, may comprise the steps of selecting a source and a target node; determining a transit node for the selection; determining a length of a shortest path between the source node and the transit node; and storing it. The network is not necessarily planar. A transit node is characterized in that a shortest path a chosen source and target node passes through it. The determined length may be stored on a computer-readable medium, using, in particular, a database table.

In order to keep the set of transit nodes small, transit nodes may be determined only for a selected subset of source and target nodes. In one embodiment of the invention, the subset of nodes may be selected randomly. In another embodiment of the invention, the subset may be constructed from source and target nodes that are most frequently selected empirically, e.g. most frequently selected sites in road networks. Further, pairs of source and target nodes may be selected according to whether they may be or are likely to be settled efficiently by a direct shortest-path computation, in which case no transit nodes are determined for that pair or query, or whether a faster determination of the length of the shortest path may be achieved using transit nodes.

According to a further embodiment, the transit node may be determined based on a partition of the network into cells. The partition may be based on a geometric grid, e.g. when the nodes are characterized by coordinates on a map. The geometric grid may be obtained by determining a geometric division of the smallest enclosing cube of the set of nodes into a grid of equal sized cells. In the two-dimensional case, the cubes may be squares and the grid may comprise equally distanced horizontal and vertical lines.

For a cell, an entire set of transit nodes may be determined. The set of transit nodes for a cell is characterized in that every shortest path departing from a node in the cell passes through at least one of its members. The set of transit nodes for the cell may be determined by a vertical and a horizontal sweep of the grid lines. Alternatively, the set of transit nodes for the cell may be determined using a set of transit nodes determined with respect to a finer grid.

The network may be a road network. The length of an edge may be measured in terms of geographical distance or in terms of travel time or according to any other suitable metric. In the following text, the term 'shortest' and related notions are used independently from the used metric.

According to the invention, a method for determining the length of a shortest path or the shortest distance between a source and a target node in a network may comprise determining a first length of a shortest path between the source node and a transit node; and determining a second length of a shortest path between a transit node and the target node, wherein the transit nodes are nodes on a shortest path between the source and the target node. The transit nodes for the source and the target node may be identical.

In one embodiment, the first and second lengths are pre-computed.

In a further embodiment, the method for determining the length of a shortest path or the shortest distance between a source and a target node in a network may further comprise the step of deciding whether the source and the target node in the network are local with respect to each other. In a geometric grid, a node is local with respect to another node if their respective cells lie within a predetermined distance to each other. In case it is decided that the source and the target node are local with respect to each other, the length of a shortest path may be determined using the Dijkstra-Algorithm.

The invention further comprises a method for determining a shortest path between a source node and a target node in a network, wherein each node v on the shortest path may (recursively) be identified by the property $d(u, trg)=l(u, v)+d(v, trg)$, wherein $d(u, trg)$ is the length of the shortest path from a node to the target node, wherein the node (u) is already known to lie on the shortest path (initially u=src), $l(u, v)$ is the length of the edge between u and v, $d(v, trg)$ is the length of the shortest path from v to the target (trg). The distances (d) may be determined using a method according to one of the above-described methods. In one embodiment, the method for determining a shortest path between a source node and a target node in a network may further comprise the step of outputting the path on a display device. The transit nodes on the path may explicitly marked or indicated, e.g. by larger or colored dots.

The invention further comprises a device for determining the length of a shortest path between a source node and a target node in a network, comprising an input control unit (610); a network information access control unit (620); a central memory (630); a length determination unit (640), wherein the length determination unit comprises a first subunit (650) for determining a first length of a shortest path between the source node and a second subunit (660) for determining a second length of a shortest path between the transit node and the target node, and a display controller (670). The device may be a navigation device.

The invention further comprises a computer-readable medium, storing a network pre-processed according to a method as described above and the use of such a medium in a navigation device.

There exist natural applications, where length-only shortest path queries are good enough, and not all the edges along the path are required. Most car navigation systems, for example, have at most a local view of the road network (if any). In that case, it suffices to know the next few edges on the shortest path, and these may be computed by just a few length-only shortest-path queries, as described above.

BRIEF DESCRIPTION OF THE DRAWINGS

Further aspects and advantages of the present invention will become more apparent when considering the following detailed description of the invention, in connection with the annexed drawing in which:

FIG. 2*a* shows the schematic representation of FIG. 1*a*, wherein three nodes are comprised within a cell;

FIG. 2b shows how the length of a shortest path in the network of FIG. 2a may be determined according to a further embodiment of the invention;

DETAILED DESCRIPTION OF THE PRESENTLY PREFERRED EXEMPLARY EMBODIMENTS OF THE INVENTION

Figure 1A:
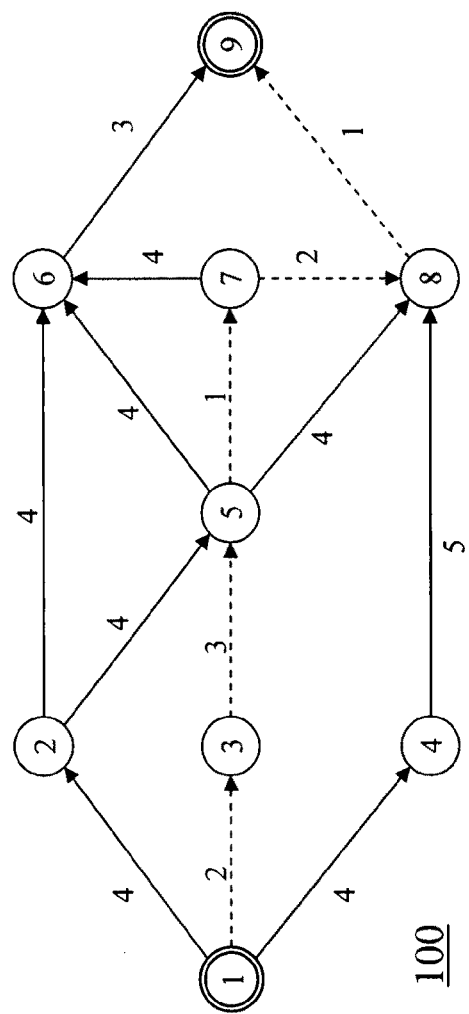
FIG. 1*a* shows a schematic representation of a road network.

FIG. 1a shows a schematic representation of a road network 100. The network has nodes 1 through 9, wherein node 1 will be called the source node and node 9 will be called the target node in the following. Each edge in the network is assigned a positive weight, e.g. a distance or travel time.

The shortest path from source node 1 to target node 9, i.e. the path having minimal combined weight, is indicated by the dotted line and runs through nodes 3, 5, 7 and node 8. The overall length may be obtained by forming the sum of the weights along the shortest path.

According to the invention, one or several the nodes on the shortest path may now be used for pre-computing and storing information about that shortest path for later use.

In particular, given the example of FIG. 1a, it may be observed that, knowing the length of the shortest path from the source node 1 to one node, e.g. node 3, and the length of the shortest path from this node, i.e. node 3 in the present example, to the target node 9, the length of the shortest path between 1 (source) and 9 (target) may be determined by adding the two lengths, which takes constant time. This approach is also susceptible to pre-computation, because only two distances need to be stored. Moreover, when lifting this approach to a set of queries pertaining to the same network, certain distances may be shared among different source/target-pairs (or queries). For example, a shortest path to target node 9 starting from node 3 as source may use the same information.

These particular nodes for which lengths of shortest paths may be pre-computed are called transit nodes. Their characteristic property is that they lie on a shortest path between a source and a target node. However, as the above example also shows, not each node on a shortest path must necessarily be included in the set of transit nodes. On the contrary, when determining the set of transit nodes for an entire set of queries with respect to a particular network, care may be taken to keep the set as small as possible while trying to allow fast determination of shortest-path lengths.

In a preferred embodiment of the invention, the node on the shortest path between source and target that is chosen as transit node is the one that is closest or adjacent to the source node. In the present example, this would be node 3. Symmetrically, the closest or adjacent transit node for the target node is node 8.

Figure 1B:
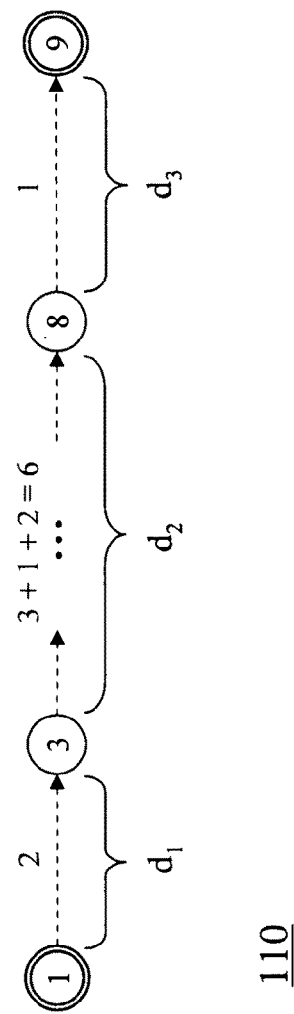
FIG. 1*b* shows how the length of a shortest path in the network of FIG. 1*a* may be determined according to one embodiment of the invention.

FIG. 1b now shows how, in this situation, the length of the shortest path from source node 1 to target node 9 passing through closest transit nodes 3 and 8 respectively, may be split into 3 lengths $d_1$, $d_2$ and $d_3$. The first length $d_1$ is the length of the shortest path between the source node 1 and the closest transit node 3. The second length $d_2$ is the length of the shortest path between the closest transit node 3 (for the source node) and the closest transit node 8 (for the target node). The third length $d_3$ is the length of the shortest path between the closest transit node 8 (for the target node) and the target node 9 itself.

The task of pre-computing the lengths of the shortest paths between arbitrary pairs of source and target nodes in the network may thus be conceived as determining, for some source node, transit nodes that lie on a shortest path to some target node, determining the lengths of shortest paths from that source node to these transit nodes and determining the lengths of shortest paths between all chosen transit nodes. Then, a length of a shortest path between a source and a target node may be determined at a later stage by retrieving the determined lengths and finding a minimal combination.

A already stated, a node closest or adjacent to the source node is preferably chosen as a transit for a source node. However, for the purpose of pre-computing the length of the shortest paths, it is not essential that always the nodes on the shortest path that are immediately adjacent to the source node are determined as closest transit nodes. Instead, one may also choose transit nodes that are a few hops away from the source node, as long as the respective shortest path lengths are correctly determined, as shown in the following. This flexibility allows defining different degrees of association between source nodes and transit nodes, depending on the application.

FIG. 2a shows the same network as FIG. 1a, wherein nodes 1, 2 and 3 are comprised within a cell 220. In other word, cell 220 defines a subgraph of the network. Now, the concept of transit nodes discussed with reference to FIGS. 1a and 1b may be generalized in that closest transit nodes may be determined for entire cells or subgraphs instead of single source and target nodes.

First, it may be noted that any shortest path starting from any node within the cell 220 (1, 2 or 3) and having target node 9 will pass through transit node 6 (for the shortest path between nodes 2 and 9) or transit nodes 5, 7 and 8 (for the shortest paths between nodes 1 and 9 or 3 and 9). As nodes 6 and 5 are adjacent to the cell 220 they may be defined as closest transit nodes for the cell. In other words, for every node comprised within the cell 220, nodes 5 and 6 may be defined as closest transit nodes.

Again, the target may (symmetrically) also be comprised within a second cell for which closest transit nodes may be determined and incorporated into the above scheme. Alternatively, a closest transit node being immediately adjacent to the target node 9 may be determined and used. In the present example (FIG. 2a) this would again be node 8.

FIG. 2b now shows how the shortest path between the source node 1 and the target node 9 in the network 200 is split up with respect to the cell 220, using, in addition, transit node 8 for the target node.

The first length $d_1$ is the length of the shortest path between the source node 1 and the closest transit node 5 with respect to cell 220. The second length $d_2$ is the length of the shortest path between the closest transit node 5 (for the cell) and the closest transit node 8 (for the target node). The third length $d_3$ is the length of the shortest path between the closest transit node 8 (for the target node) and the target node 9 itself.

The task of pre-computing the lengths of the shortest paths between arbitrary pairs of source and target nodes in a network comprising cells may thus be conceived as determining, for some cell of the network, transit nodes that lie on a shortest path from (one node of) the cell to some target node, determining the lengths of shortest paths between the nodes of the cell and the chosen transit nodes, determining the lengths of shortest paths between all transit nodes and storing them in some machine-readable memory.

Then, knowing, for every node comprised within the cell 220, the length of the shortest path from that node to the closest transit node of cell 220 that is on the shortest path to the target node, and the length of a shortest path from that closest transit node to the target node, the length of the shortest path from the source node 1 to the target node 9 may be determined or reconstructed by combining the two known lengths. However, in the present example, there are two transit nodes for the cell (nodes 5 and 6). If it is not known a priori which one lies on the shortest path, all possible combinations with both nodes have to be tried in order to find the minimal combination. In the present example, this means that one determines the lengths of the shortest paths from node 1 to node 5 and from node 1 to node 6, which are pre-computed and then the lengths of the shortest paths from these nodes 5 and 6 to the target node 9 and then compares the two lengths in order to find the minimal one (in this case, the minimal length is 9).

If, symmetrically, there exist one or several transit nodes for the target node, one may retrieve the lengths of the shortest paths from the source node to its transit node(s), the lengths of the shortest paths from the target node to its transit node(s) and the lengths of the shortest paths between these transit nodes, which are assumed to have been pre-computed. By minimizing over all possible combinations of these three respective lengths, the length of the shortest path between source and target may be found.

Considering now that in some networks, in particular road networks, each node may be identified by its coordinates in a metric space (its position on a map), cells as discussed in relation to FIGS. 2a and 2b may also be defined in metric terms, given such coordinates.

Figure 3:
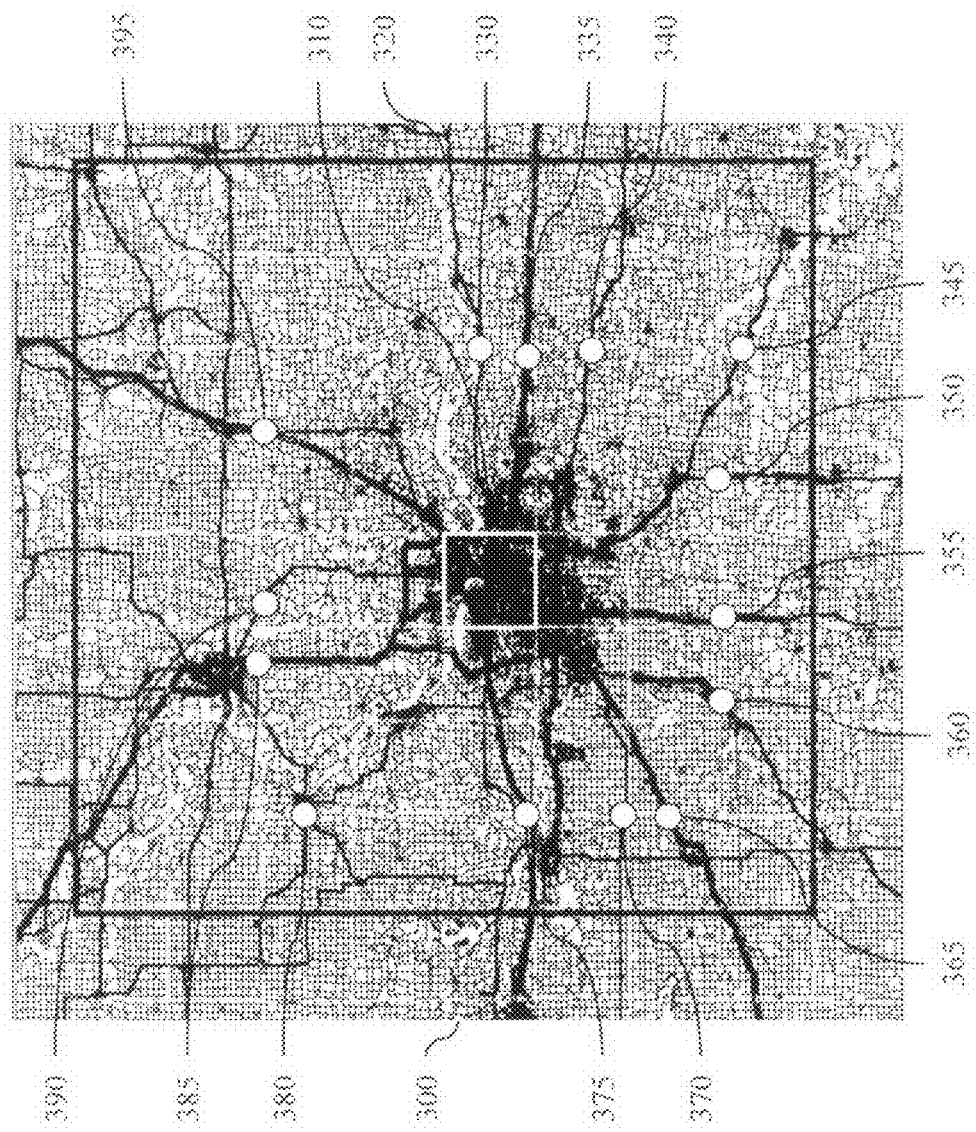
FIG. 3 shows a part of the US road network wherein transit nodes for a cell are determined according to another embodiment of the invention.

FIG. 3 shows a part of the US road network 300, wherein transit nodes for a cell 310 are determined according to another embodiment of the invention. The cell 310 is indicated as a white square in the middle of the figure. The black square delineates a neighborhood 320 of the cell 310. Transit nodes 330 to 395 are indicated by the bold white dots. They have been determined according to the invention for source nodes comprised within cell 310 and for target nodes outside of neighborhood 320. Surprisingly, there are only 14 of them in the present example, using a 256×256 subdivision of the US road network. In other words, no matter where a journey inside the cell 310 starts, if the final destination lies outside the neighborhood 320, every shortest path to that destination will pass through one of the 14 roads marked by the bold dots.

This property, that long-distance trips (where the length is to be seen relative to the "starting region") pass through few transit nodes is to some degree invariable to scale.

Figure 4:
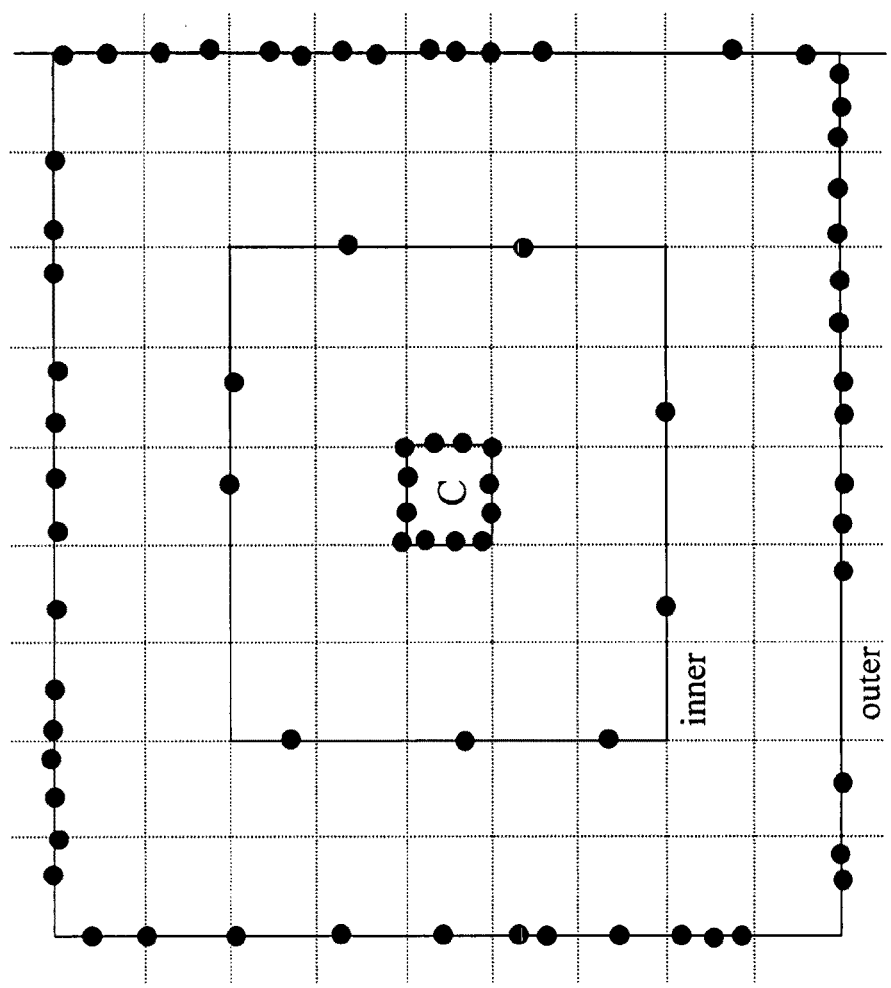
FIG. 4 shows a schematic diagram of an inner and an outer region employed for determining the closest transit nodes for a cell according to an embodiment of the invention.

FIG. 4 shows in more detail how transit nodes may be determined in a network as the one presented in FIG. 3, wherein each node of the network is identified by coordinates, by choosing a (geometric) partition of the network into square cells.

With respect to the smallest enclosing square of the set of nodes (having an x and a y coordinate each), and the natural subdivision of this square into a grid of g×g equal-sized square cells, for some integer g, a set of transit nodes for each cell C may be defined as follows. Let $S_{inner}$ and $S_{outer}$ be the squares consisting of 5×5 cells and 9×9, respectively, each with C at their center. Let $E_C$ be the set of edges which have one endpoint inside C, and one outside, and define the set $V_C$ of what are called crossing nodes by picking for each edge from $E_C$ the node with smaller id. Define $V_{outer}$ and $V_{inner}$ accordingly.

The set of closest transit nodes for the cell C is now the set of nodes v from $V_{inner}$ with the property that there exists a shortest path from some node in $V_C$ to some node in $V_{outer}$ which passes through v. The overall set of transit nodes is just the union of these sets over all cells. If two nodes are at least four grid cells apart in either horizontal or vertical direction, then the shortest path between the two nodes must pass through one of these transit nodes. Also note that if a node is a transit node for some cell, it is likely to be a transit node for many other cells, each of them two cells away, too.

In one embodiment of the invention, these sets of transit nodes may be computed as follows. For each cell, compute all shortest paths between nodes in $V_C$ and $V_{outer}$, and mark all nodes in $V_{inner}$ that appear on at least one these shortest paths. FIG. 4 will again help to understand this. However, such a computation would take several days even for a relatively coarse grid like the 128×128 grid.

Figure 5:
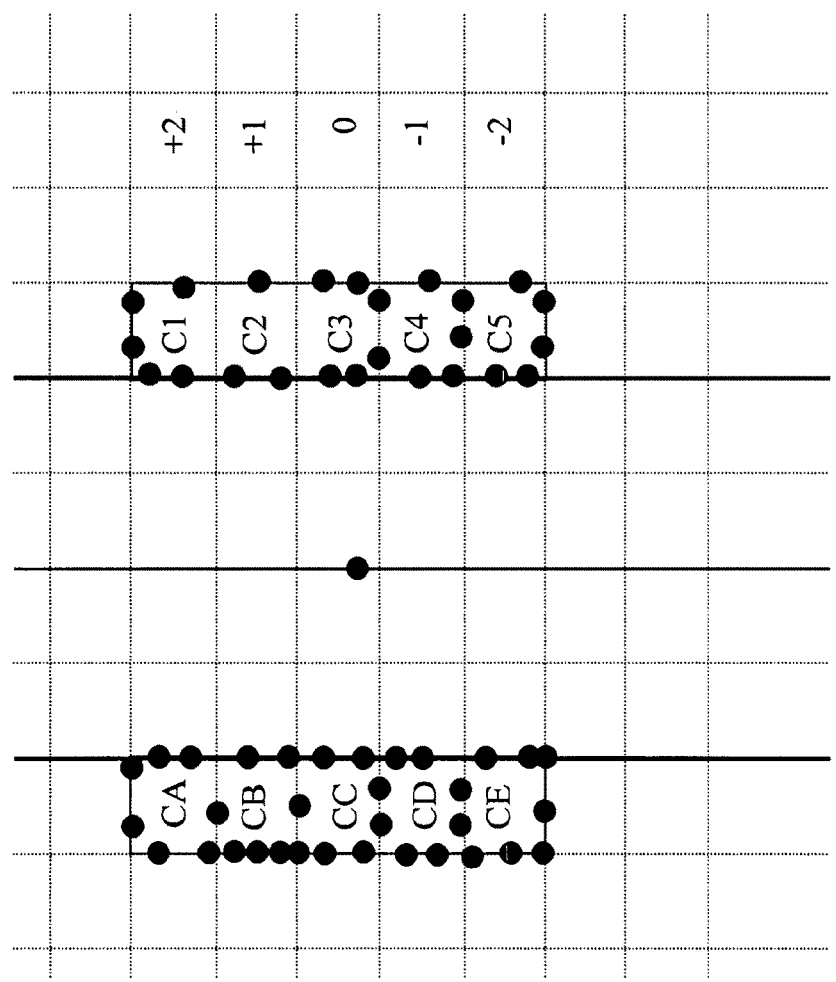
FIG. 5 illustrates how the closest transit nodes of a cell may be determined according to another embodiment of the invention.

FIG. 5 illustrates how the closest transit nodes of a cell may be determined according to another embodiment of the invention. Now, the following simple sweep-line algorithm may be employed, which runs Dijkstra computations within a radius of only three grid cells, instead of five, as in the naive approach.

Considering one vertical line of the grid after the other, the following steps may be carried out for each such line. Let v be one of the endpoints of an edge intersecting the line. A local Dijkstra computation is run for each such v as follows: let $C_{left}$ be the set of cells two grid units left of v and which have vertical distance of at most 2 grid units to the cell containing v. Define $C_{right}$ accordingly. In FIG. 5, $C_{left}$={CA;CB;CC;CD} and $C_{right}$={C1;C2;C3;C4}.

The local Dijkstra computation is started at v until all nodes on the boundary of the cells in $C_{left}$ and $C_{right}$ respectively are settled; the distance to v is remembered for all settled nodes. This Dijkstra run settles nodes at a distance of roughly three grid cells. After having performed such a Dijkstra computation for all nodes v on the sweep line, all pairs of boundary nodes ($v_L$; $v_R$) are considered where $v_L$ is on the boundary of a cell on the left and $v_R$ is on the boundary of a cell on the right and the vertical distance between those cells is at most 4. By iteration over all potential transit nodes v on the sweep line, the set of transit nodes for which $d(v_L; v) + d(v; V_R)$ is minimal is determined. With this set of transit nodes, the cells corresponding to $v_L$ and $v_R$, respectively, are associated.

Two such sweeps, one vertical and one horizontal, will compute exactly the set of transit nodes defined above (the union of all sets of closest transit nodes). The computation is space-efficient, because at any point in the sweep, one only needs to keep track of distances within a small strip of the network. The consideration of all pairs ($v_L$; $v_R$) is negligible in terms of running time. As a further improvement, the above computation may first be done for some refinement of the grid for which one actually wants to compute transit nodes. For the finer grid, only those sweep lines are considered, which also lie on the coarser grid.

When computing the transit nodes for the coarser grid, one may then restrict oneself to nodes from the sets of transit nodes computed for the finer grid. This may be generalized to a sequence of refinements.

Computing the Distance Tables

For each node v, the distances to the access transit nodes of its cell may be memorized from the Dijkstra computations which had these transit nodes as source. A standard all-pairs shortest path computation yields the distances between each pair of transit nodes. Since the number of transit nodes is small (less than 8 000 for the US road network, using a 128×128 grid), this takes negligible time.

Shortest-Path Queries (Length Only)

It is next described how to compute the length of the shortest path between a given source node src and a given target node trg, based on the preprocessing described in the previous two subsections.

First, a description for the scenario where only a single level of transit nodes is pre-computed. The basic steps are as follows:
1. If src and trg are less than four grid cells (with respect to the grid used in the pre-computation) apart, compute the distance from src to trg via an algorithm suitable for local shortest path queries. Otherwise, perform the following steps:
2. Fetch the lists Tsrc and Ttrg of the closest transit nodes for the grid cells containing src and trg, respectively. Also fetch the lists of pre-computed distances d(src; tsrc); tsrc∈Tsrc and d(s; ttrg); ttrg∈Ttrg.
3. For each pair of tsrc∈Tsrc and ttrg∈Ttrg compute the sum of the lengths of the shortest path from src to tsrc, from tsrc to ttrg, and from ttrg to trg, which is d(src; tsrc)+d(tsrc; ttrg)+d(ttrg; trg). Note that one may have tsrc=ttrg, in which case d(tsrc; ttrg)=0.
4. Compute the length of the shortest path from src to trg as the minimum of the |Tsrc|×|Ttrg| distances computed in step 3.

Steps 2-4 will only be executed if source and target are more than four grid cells apart. Then, by the definition of the transit nodes, the shortest path between source and target must pass through at least one transit node. But then, by the definition of closest transit nodes, the shortest path from src to trg will pass through one of the closest transit node of src as well as through one of the closest transit nodes of trg. The shortest path will therefore be among those tried in step 3, and none of the other paths can be shorter.

Since the distances from each node to its closest transit nodes and the distances between each pair of transit nodes have been pre-computed, steps 2-4 take time $O(|T_{src}| \times |T_{trg}|)$. The average number of closest transit nodes of a node is a small constant—about 10 for the US road network.

Shortest-Path Queries (with Edges)

It will now be described how the procedure given in the previous subsection may be enhanced to also output the edges along the shortest path from a given source node src to a given target node trg.

Assuming that the procedure from the previous subsection has already been executed, that is, the length of the shortest path from src to trg is already known and assuming that the part of the shortest path from src to some u (initially, u=src) has already been found, let d(u; trg), which may be computed as d(src; trg)−d(src; u), be the length of the part of the path which has not been found yet. Then the next node on the shortest path is that node v adjacent to u with the property that d(u; trg)=l(u; v)+d(v, trg), l being the weight or length of that particular edge.

This node can therefore be easily identified from the nodes adjacent to u, if only the distances d(v; trg) may be computed. But these are just instances of the problem solved in the previous subsection: given two nodes, compute the length of the shortest path between them. As described so far, the computation of d(v, trg) would resort to the special algorithm for local shortest-path queries when v and trg are less than four grid cells apart. This may be avoided, if the shortest path from src is computed only until four grid cells-away from trg, and, symmetrically, the shortest path is computed from trg until four grid cells away from src. This will yield the full path if src and trg are at least eight grid cells apart. Otherwise, there is indeed no way around running the local algorithm.

Handling Local Queries

If source and target are very close to each other (less than four grid cells apart in both horizontal and vertical direction for length-only shortest-path queries; less than eight grid cells apart in that way when computing the edges along the path), one may not compute the shortest path via the transit nodes. This makes sense intuitively: there is hardly any hierarchy of roads in an area like, for example, downtown Manhattan, and a shortest path between two locations within the same such area will mostly consist of (small) roads of the same kind. In such a situation, no small set of transit nodes exist.

However, most shortest-path algorithms are much faster, when source and target are close to each other. In particular, Dijkstra's algorithm is about a thousand times faster for local queries, where source and target are at most four grid cells apart, for an 128×128 grid laid over the US road network, than for arbitrary random queries (most of which are long-distance). However, the non-local queries are roughly a million times faster and the fraction of local queries is about 1%, so the average running time over all queries would be spoiled by the local Dijkstra queries.

Using Multi-Level Grids

In the embodiment as described so far, there is an obvious trade-off between the size of the grid and the percentage of local queries which cannot be processed via transit node routing. For a very coarse grid, say 64×64, the number of transit nodes, and hence the table storing the distances between all pairs of transit nodes, would be very small, but the percentage of local queries would be as large as 10%. For a very fine grid, say 1024×1024, the percentage of local queries is only 0.1%, but now the number of transit nodes is so large, that one may no longer store, let alone compute, the distances between all pairs of transit nodes.

The following table gives the exact tradeoffs, also with regard to preprocessing time. Note that the average query processing time for the non-local queries is around 10 microseconds, independent of the grid size. The table shows the number |T| of transit nodes, space consumption of the distance table, average number |A| of closest transit nodes per cell, percentage of non-local queries (averaged over 100 000 random queries), and pre-processing time to determine the set of transit nodes of the US road network.

| | \|T\| | \|T\| × \|T\|/node | avg. \|A\| | % global queries | pre-processing |
|---|---|---|---|---|---|
| 64 × 64 | 2042 | 0.1 | 11.4 | 91.7% | 498 min |
| 128 × 128 | 7426 | 1.1 | 11.4 | 97.4% | 525 min |
| 256 × 256 | 24899 | 12.8 | 10.6 | 99.2% | 638 min |
| 512 × 512 | 89382 | 164.6 | 9.7 | 99.8% | 859 min |
| 1024 × 1024 | 351484 | 2545.5 | 9.1 | 99.9% | 964 min |

To achieve a small fraction of local queries and small number of transit nodes at the same time, a hierarchy of grids may be employed. A two-level grid shall briefly be described now, which may be used for an initial implementation. The generalization to an arbitrary number of levels is straightforward.

The first level is an 128×128 grid, which may be precomputed just as described so far. The second level is an 256×256 grid. For this finer grid, the set of all transit nodes is computed as described, but distances are only computed and stored between those pairs of these transit nodes, which are local with respect to the 128×128 grid. This is a fraction of about 1=200th of all the distances, and can be computed and stored in negligible time and space. Note that in this simple approach, the space requirement for the individual levels simply add up.

Query processing with such a hierarchy of grids is straightforward. In a first step, determine the coarsest grid with respect to which source and target are at least four grid cells apart in either horizontal or vertical direction. Then compute the shortest path using the transit nodes and distances computed for that grid, just as described above. If source and target are at most four grid cells apart with respect to even the finest grid, one may resort to a special algorithm for local queries.

Space Reduction Heuristic

As described so far, for each level in our grid hierarchy, the distances from each node in the graph to each of its closest transit nodes are stored. For the US road network, the average number of closest transit nodes per node is about 11, independent of the grid size, and most distances can be stored in two bytes. For a two-level grid, this gives about 44 bytes per node.

To reduce this, the following additional heuristic may be implemented. It may be observed that it is not necessary to store the distances to the closest transit nodes for every node in the network. Consider a simplification of the road network where chains of degree 2 nodes are contracted to a single edge.

In the remaining graph one greedily computes a vertex cover, that is, one selects a set of nodes such that for every edge at least one of its endpoints is a selected node. Using this strategy one may determine about a third of all nodes in the network to store distances to their respective closest transit nodes. Then, for the source/target node v of a given query one may first check whether the node is contained in the vertex cover, if so one may proceed as before. If the node is not contained in the vertex cover, a simple local search along chains of degree 2 nodes yields the desired distances to the closest transit nodes.

The average number of distances stored at a node reduces from 11:4 to 3:2 for the 128×128 grid of the US, without significantly affecting the query times. The total space consumption of our grid data structure then decreases to 16 bytes per node.

Figure 6:
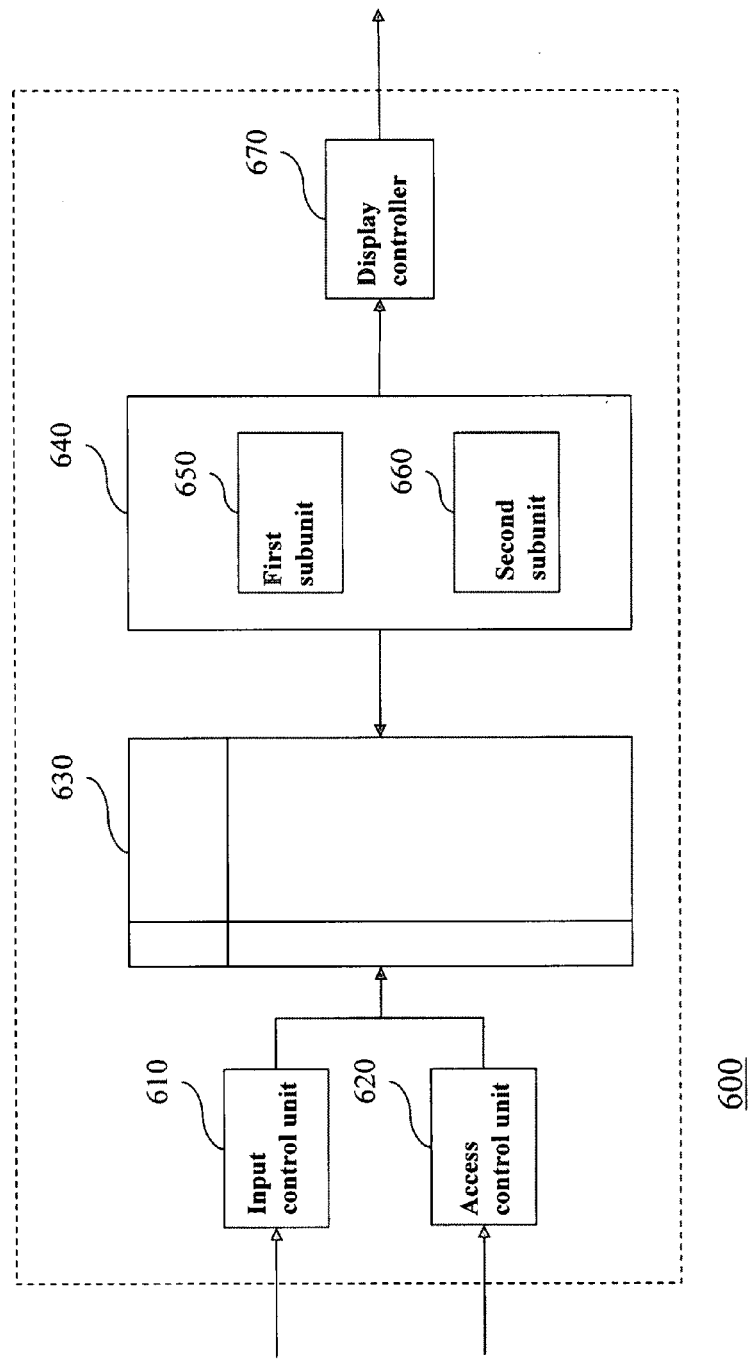
FIG. 6 shows a block diagram of a device for determining the length of a shortest path between a source and a target node in a network according to an embodiment of the invention.

FIG. 6 shows a block diagram of a device 600 for determining the length of a shortest path between a source and a target node in a network according to an embodiment of the invention. The device 600 comprises an input control unit 610 for controlling the input of a source and a target in a given network. The input may be effected manually, e.g. by a keyboard or a mouse.

The device 600 further comprises a network information access control unit 620 for controlling access to network information needed for determining the length of a shortest path between the source and the target node. The network information access control unit 620 may access relevant information from a local machine-readable memory, e.g. a database or a compact disc, but may also access remote data sources comprising such information, by wire or over the air, e.g. by remotely accessing a server over an Internet connection.

The device 600 further comprises a central memory 630 for storing data received from the input control unit 610 and the network information access control unit 620 for further processing by the length determination unit 640 which uses this data for determining the length of a shortest path between a given source and target node. The length determination unit 640 comprises two subunits 650 and 660. The first subunit 650 determines a first length of a shortest path between the source node and a transit node on the shortest path between the source and the target node. The second subunit 660 determines a second length of a shortest path between the transit node and the target node. The length determination unit 640 may further comprise a unit (not shown) for combining the two lengths in order to determine the desired length of a shortest path between the source and the target node.

Finally, the device 600 comprises a display controller 670 for controlling the display of the length of a shortest path between a given source and target node. Controlling the display may comprise formatting the length in a way a suitable for display in a web browser.

Figure 7:
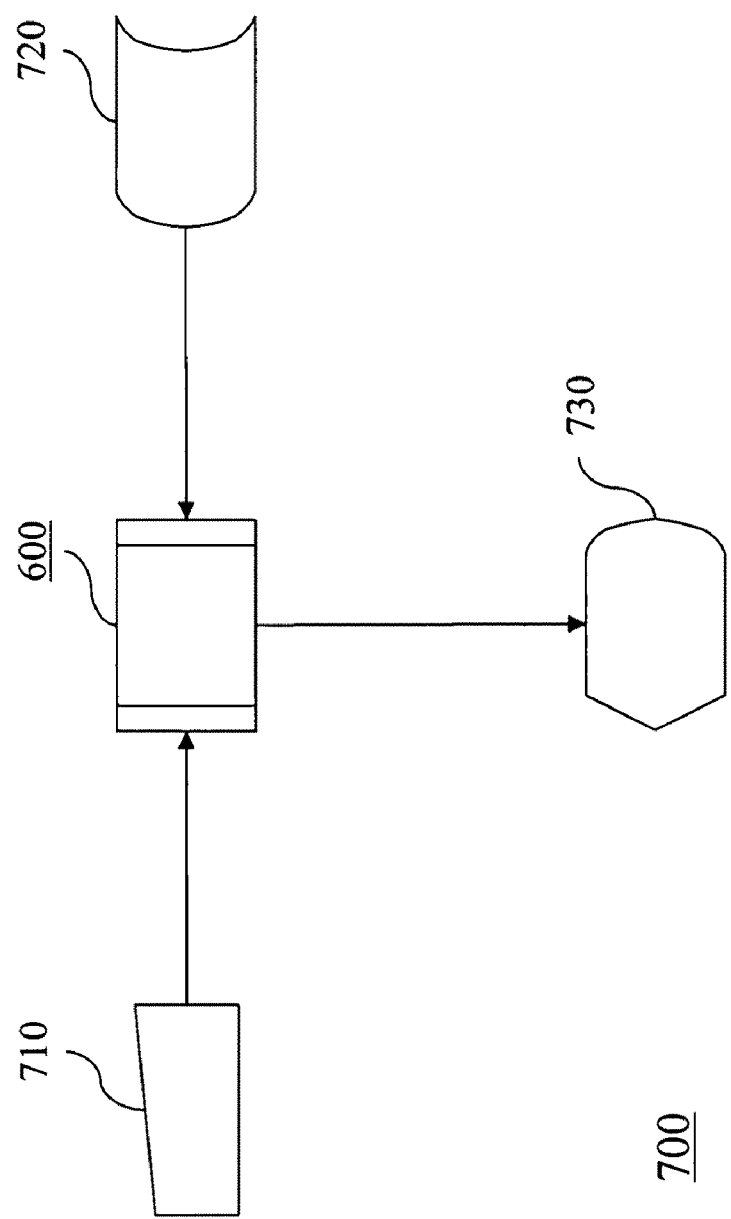
FIG. 7 shows how the device shown in FIG. 6 may be incorporated in a system for determining the length of a shortest path between a source and a target node in a network according to another embodiment of the invention.

FIG. 7 shows how the device 600 described in connection with FIG. 6 may be incorporated in a system 700 for determining the length of a shortest path in a network. The system may comprise a manual input unit 710 in connection with the input control unit 610 of the device 600. The input unit may be used for inputting a source and a target in a given network and may comprise a keyboard, a mouse, a sketch pad or the like, or any combination thereof.

The system 700 may further comprise a data source 720 in connection with the network information access control unit 620 of the device 600. The data source 720 may be a tape, a magnetic disk, a CD-ROM, a flash memory, a database or the like, or any combination thereof. The connection may be local or remote, by wire or wireless, by the Internet protocol or any other known networking protocol. In particular, the data source may comprise tables of information determined according to one of the above-described methods for network pre-processing.

Finally, the system 700 may comprise a display device 730 for displaying information determined by the device 600. The display device 730 may be connected to the display controller 670 of the device 600. Again, the connection may be local or remote, by wire or wireless, by the Internet protocol or any other known networking protocol. In particular, the display device may be a personal computer (PC) in combination with an Internet browser.

However, the person skilled in the art will immediately understand that the system 700 comprising the above devices may also readily be implemented in part or entirely on a handheld device.

Graphical User Interface

When using the above described methods in a navigation device, the length of the shortest path an the path itself may be displayed for the convenience of a user. In addition or alternatively, the transit nodes on the shortest path may be shown instead of the actual path or by marking them on the path.

CONCLUSION

It will be apparent to the person skilled in the art that the invention is by no means limited to the context of road navigation. In other words, a method for determining the lengths of a shortest path between two nodes in a network may achieve the same benefits when applied to other networks. In particular, the above-described methods may also be applied in an internet routing device.

While certain configurations of structures have been illustrated for the purposes of presenting the basic structures of the present invention, one of ordinary skill in the art will appreciate that other variations are possible which would still fall within the scope of the appended claims. While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer-implemented method for pre-processing a road network, wherein the road network comprises nodes and edges, each edge having a length measured according to a given metric, the method comprising the steps of:
   selecting a source and a target node;
   determining a transit node for the selection, wherein the transit node is a node on the shortest path between the source node and the transit node and is determined based on a partition of the network into cells;
   determining a length of a shortest path between the source node and the transit node; and
   storing the length in a computer-readable medium.

2. The method of claim 1, wherein the partition of the network into cells is based on a geometric grid.

3. The method of claim 2, further comprising the step of determining a set of transit nodes for a cell.

4. The method of claim 3, wherein determining the set of transit nodes for a cell comprises a vertical and a horizontal sweep of the grid.

5. The method of claim 1, wherein the set of transit nodes for a cell is determined based on a set of transit nodes determined with respect to a finer grid.

6. The method of claim 3, wherein the length of an edge is measured in terms of geographical distance.

7. The method of claim 5, wherein the length of an edge is measured in terms of travel time.

8. Computer-readable medium, storing a network pre-processed according to one of the preceding claims.

9. A method for determining the length of a shortest path between a source and a target node in a road network, the method comprising the steps of:
   determining a first closest transit node for the source node; and
   determining a second closest transit node for the target node,
   such that the sum of the lengths of the paths between the source node and the first transit node, between the first transit node and the second transit node, and between the second transit node and the target becomes minimal, wherein the lengths are precomputed and determined from a computer-readable memory.

10. Method according to claim 9, further comprising the step of deciding whether the source and the target node in the network are local with respect to each other.

11. The method of claim 10, wherein the length of a shortest path is determined using the Dijkstra-Algorithm, if the source and the target node are local with respect to each other.

12. A method for determining a shortest path between a source node (src) and a target node (trg) in a network, wherein each node v on the shortest path is identified by the property $$d(u,trg)=l(u,v)+d(v,trg),$$

wherein
   d(u, trg) is the length of the shortest path from a node (u) to the target node, wherein the node (u) is already known to lie on the shortest path (initially u=src);
   l(u, v) is the length of the edge between u and v;
   d(v, trg) is the length of the shortest path from v to the target (trg); and
wherein the distances (d) are determined using a method according to claim 11.

13. The method according to claim 12, further comprising the step of outputting the path on a display device.

14. The method according to claim 13, wherein the transit nodes on the path are explicitly marked.

15. A device for determining the length of a shortest path between a source node and a target node in a network, comprising:
   an input control unit;
   a network information access control unit;
   a central memory;
   a transit node determination unit, wherein the transit node determination unit comprises a first subunit for determining a first closest transit node for the source node; and a second subunit for determining a second closest transit node for the target node, such that the sum of the lengths of the paths between the source node and the first transit node, between the first transit node and the second transit node, and between the second transit node and the target becomes minimal, wherein the lengths are precomputed and determined from a computer-readable memory; and
   a display controller.

16. Use of the computer-readable medium of claim 8 in a navigation device.

* * * * *